(12) United States Patent
Sakaki et al.

(10) Patent No.: US 8,044,118 B2
(45) Date of Patent: Oct. 25, 2011

(54) PREPARATION PROCESS OF OIL EXTENDED RUBBER FOR TIRE, OIL EXTENDED RUBBER FOR TIRE, AND RUBBER COMPOSITION AND TIRE USING THE SAME

(75) Inventors: Toshiaki Sakaki, Kobe (JP); Naoya Ichikawa, Kobe (JP); Takayuki Hattori, Kobe (JP); Chee-Cheong Ho, Selangor (ML); Choong Dick Hean, Kedah (ML)

(73) Assignee: Sumitomo Rubber Industries, Ltd., Kobe (JP)

( * ) Notice: Subject to any disclaimer, the term of this patent is extended or adjusted under 35 U.S.C. 154(b) by 960 days.

(21) Appl. No.: 11/723,680

(22) Filed: Mar. 21, 2007

(65) Prior Publication Data
US 2007/0232745 A1 Oct. 4, 2007

(30) Foreign Application Priority Data
Mar. 28, 2006 (JP) ................. 2006-087730

(51) Int. Cl.
*C08C 1/14* (2006.01)
*B60C 1/00* (2006.01)
(52) U.S. Cl. ........ 523/335; 524/300; 524/313; 524/572; 524/575.5
(58) Field of Classification Search .................. 524/300, 524/313, 572, 575.5; 523/335
See application file for complete search history.

(56) References Cited

U.S. PATENT DOCUMENTS
3,108,980 A * 10/1963 Gwin et al. ................. 524/274
2004/0211111 A1 10/2004 Kikuchi
2005/0209390 A1* 9/2005 Yagi et al. .................... 524/493

FOREIGN PATENT DOCUMENTS

| | | |
|---|---|---|
| CN | 1670062 A | 9/2005 |
| EP | 1 577 341 A1 | 9/2005 |
| EP | 1 798 257 A1 | 6/2007 |
| GB | 1000588 | 8/1965 |
| GB | 1075234 | 7/1967 |
| JP | 6-212185 A | 8/1994 |
| JP | 2003-213039 A | 7/2003 |
| JP | 2005-120153 A | 5/2005 |
| JP | 2005-263956 A | 9/2005 |
| JP | 2007-51206 A | 3/2007 |

OTHER PUBLICATIONS

Machine translation of JP 2007-051206, Mar. 1, 2007.*
WPI/Thomsen, Derwent Publications Ltd., London, GB; AN 2007-262668. XP002439000.

* cited by examiner

*Primary Examiner* — Vickey Nerangis
(74) *Attorney, Agent, or Firm* — Birch, Stewart, Kolasch & Birch, LLP

(57) ABSTRACT

The present invention provides a process for preparing an oil extended rubber, in which an effect on environments can be taken into consideration, provision for the future decrease of petroleum supply can be satisfied, and further, strength is excellent without molecular breakage, an oil extended rubber obtained by the preparation process, and a tire using the oil extended rubber. A process for preparing an oil extended rubber, comprising (a) a step of preparing an oil-in-water type emulsion by emulsifying a vegetable oil having an iodine value of not less than 135 with a surfactant, (b) a step of mixing said emulsion and a modified natural rubber latex, and then aging the mixture, and (c) a step of coagulating the mixture obtained in the step (b) to obtain a lump of a rubber, an oil extended rubber obtained by the preparation process, and a rubber composition for a tire and a tire which use the oil extended rubber.

8 Claims, No Drawings

PREPARATION PROCESS OF OIL EXTENDED RUBBER FOR TIRE, OIL EXTENDED RUBBER FOR TIRE, AND RUBBER COMPOSITION AND TIRE USING THE SAME

BACKGROUND OF THE INVENTION

The present invention relates to a preparation process of an oil extended rubber for a tire, the oil extended rubber for a tire, and a rubber composition and tire which use the oil extended rubber.

Conventionally, in processing a rubber for a tire, mastication has been carried out before carrying out kneading of materials in order to improve processability of rubber or lower a viscosity of rubber. Particularly, processability of a natural rubber (NR) having a large molecular weight and unstable viscosity varies depending on a degree of mastication, and dispersibility of chemicals can be improved, therefore, mastication step has been an essential step.

In view of such a background, for the purposes of lowering a high viscosity of a rubber to make kneading easy, and further, improving dispersibility of other components to be blended, a rubber containing an oil (oil extended rubber) is commercially available.

The commercially available oil extended rubber is mainly a synthetic rubber, and for the purpose of improving processability, such a rubber obtained by homogeneously mixing an oil with the synthetic rubber to be baled is generally used.

However, in recent years, environmental problems have been regarded as important, and regulations on $CO_2$ emission have been made more rigorous. Further, since there is a limitation on petroleum resources, and supply thereof has been decreasing year by year, oil price is predicted to surge more in future, accordingly, there is a possibility that use of raw materials derived from petroleum resources such as a synthetic rubber has its limit. Therefore, assuming that petroleum oil is depleted in the future, it is desirable to use resources other than petroleum such as NR and epoxidized natural rubber (ENR).

As for a process for preparing an oil extended rubber by mixing an oil in a rubber, various processes are known and the preparation process is not particularly limited, and for example, a process of adding an oil to a solid rubber in a kneader is known. As for a rubber obtained by solution polymerization, a process of adding an oil to a polymerized rubber containing a solvent and then removing the solvent is known. As for a rubber obtained by emulsion polymerization, a process of adding an oil directly to a rubber in a state of a latex, and forcibly stirring the mixture and then coagulating the rubber is known.

In the case of kneading an oil using a kneader after solidifying a rubber, the rubber easily slips inside of the kneader if the oil is charged together with the rubber, therefore only a rubber is kneaded at first, and then an oil is added thereto to be kneaded. However, in this case, since a viscosity of a rubber is high, shearing strength is easily applied on the rubber during a period of time until the oil is added, and thus a rubber molecule is partially broken. When a rubber product is prepared using an oil extended rubber obtained in this manner, since properties of the rubber product such as abrasion resistance, strength, and flex crack growth resistance are deteriorated, there has been a problem that such a rubber product is lowered in strength and abrasion resistance. In addition, in the preparation process as described above, in which an oil is added in a stage of kneading after a step of mastication of a rubber, there has been a problem that it takes time to absorb an oil, and thus, productivity is deteriorated.

Further, when an oil is added to a rubber latex to be stirred, there has been a problem that a degree of dissolving the oil into the rubber latex is low, and thus, the oil easily remains in an aqueous phase. In order to prevent such a problem, a method of stirring a rubber latex and an oil at a high speed and then coagulating the mixture is known. However, in this case, in order to homogeneously mix the oil in the rubber, the coagulated rubber is kneaded with an extruder or the like, which results in applying shearing strength on the rubber, and causing a problem that breakage of a rubber molecule is generated.

JP-A-2005-263956 discloses a rubber composition for a tire tread, in which mal-distribution of silica and compatibility with an oil can be improved by compounding specified amounts of a specific rubber component, specific silica, oils derived from vegetables, a silane coupling agent and an anionic surfactant, and further a rolling resistance property and wet grip performance are improved without lowering processability and abrasion resistance. However, it is not taken into consideration to improve processability and physical properties of a rubber by preparing an oil extended rubber by a specific preparation process.

SUMMARY OF THE INVENTION

An object of the present invention is to provide a preparation process of an oil extended rubber for a tire having excellent strength and being free from molecular breakage, in which an effect on environments can be taken into consideration, and provision for the future decrease of petroleum supply can be satisfied, and to provide an oil extended rubber for a tire obtained by the preparation process, and a rubber composition for a sidewall and a tire which use the oil extended rubber for a tire.

The present invention relates to a process for preparing an oil extended rubber for a tire comprising (a) a step of preparing an oil-in-water type emulsion by emulsifying a vegetable oil having an iodine value of not less than 135 with a surfactant, (b) a step of maturing after mixing the vegetable oil emulsion and a modified natural rubber latex, and (c) a step of coagulating the mixture obtained in the step (b) to obtain a lump of a rubber.

It is preferable that the modified natural rubber latex is an epoxidized natural rubber latex having an epoxidation ratio of 5 to 60% by mol.

It is preferable that the above-described vegetable oil is at least one vegetable oil selected from the group consisting of linseed oil, tung oil, safflower oil, and terpenes.

It is preferable that the above-described surfactant comprises a nonionic surfactant.

It is preferable that the surfactant has a hydrophilic part (A) and a lipophilic part (B) and that the hydrophilic part (A) has 2 to 40 recurring units of oxyethylene.

It is preferable that the lipophilic part (B) of the surfactant is an alkyl ether structure or an alkenyl ether structure.

It is preferable that the surfactant comprises at least one surfactant selected from the group consisting of polyoxyalkylene alkyl ether, sorbitan fatty acid ester, polyoxyethylene sorbitan fatty acid ester, polyoxyethylene sorbitol fatty acid ester, glycerin fatty acid ester, polyoxyethylene fatty acid ester, and polyoxyethyene hydrogenated castor oil.

It is preferable that the step (c) of obtaining a lump of a rubber by coagulating the mixture obtained in the step (b) is carried out without using a dipping mold by a method of contacting the mixture obtained in the step (b) with steam, a method of adding a metallic salt, or a method of charging in an acid solution.

The present invention also relates to an oil extended rubber for a tire obtained by the above-described preparation process.

The present invention further relates to a tire using the oil extended rubber for a tire.

The present invention relates to a rubber composition for a tire, comprising, as rubber components, the oil extended rubber and a diene rubber.

In the rubber composition of the present invention, it is preferable that the diene rubber is a natural rubber.

It is preferable that the rubber composition for a tire of the present invention is a rubber composition, which is used for a sidewall, and comprises 5 to 75 parts by weight of silica on the basis of 100 parts by weight of the rubber components.

The present invention relates to a tire, which uses the rubber composition.

DETAILED DESCRIPTION

The preparation process of an oil extended rubber for a tire of the present invention comprises (a) a step of preparing an oil-in-water type (hereinafter, referred to as O/W type) emulsion by emulsifying a vegetable oil having an iodine value of not less than 135 with a surfactant, (b) a step of maturing after mixing the O/W type emulsion and a modified natural rubber latex, and (c) a step of coagulating the mixture obtained in the step (b) to obtain a lump of a rubber.

In the preparation process of an oil extended rubber for a tire of the present invention, before mixing a specific vegetable oil with a modified natural rubber latex, by emulsifying the vegetable oil or derivatives thereof in the step (a), the modified natural rubber quickly homogeneously absorbs the vegetable oil or derivatives thereof, thereby, in the obtained oil extended rubber, the vegetable oil or derivatives thereof can be homogeneously dispersed, further, the insoluble vegetable oil or derivatives thereof is scarcely present in a solution after coagulation, particularly a phenomenon of floating the vegetable oil or derivatives thereof on the surface is not observed at all, and an effect of having a small load of waste water treatment can be obtained.

In the step (a), a vegetable oil (including derivatives thereof), water and a surfactant are used.

As for an oil, oils derived from petroleum resources such as aromatic oils and synthetic plasticizers, and derivatives of animal oils or vegetable oils are known, and vegetable oils are used from the viewpoint that an effect on environments can be taken into consideration, provision for the future decrease of petroleum supply can be satisfied, and further, if the oil is a vegetable oil or derivative thereof, the concept of carbon neutral is applied and carbon dioxide is not generated when a rubber product after its use is burned. In general, a vegetable oil itself is an esterified product of glycerin, polarity thereof is higher than the above-described oils derived from petroleum resources, and compatibility with modified natural rubbers such as an epoxidized natural rubber (ENR) is excellent.

An iodine value of a vegetable oil is not less than 135. If the iodine value of a vegetable oil is less than 135, when a prepared oil extended rubber and a natural rubber (NR) are blended and applied for a rubber composition for a sidewall, flex crack growth resistance is inferior. A vegetable oil having an iodine value of more than 210 has not been found yet. Examples of a vegetable oil satisfying the above-described conditions are linseed oil, tung oil, and safflower oil. Terpenes can be also favorably used, although terpenes are not esterified products of glycerin. Examples of terpenes are, for instance, α-pinene, β-pinene, limonene and turpentine oil in natural fats and oils such as turpentine, and polymerized products thereof. In the present invention, terpenes in addition to vegetable oils which are esterified products of glycerin are referred to as vegetable oils.

A content of vegetable oil in an emulsion comprising the vegetable oil, water and a surfactant is preferably not less than 30% by weight, more preferably not less than 40% by weight. When the content of the vegetable oil is less than 30% by weight, an amount of the emulsion to be added is increased, and there is a tendency that a coagulation treatment of a modified natural rubber latex such as an epoxidized natural rubber latex (ENR latex) becomes difficult. The content of vegetable oil is preferably not more than 80% by weight, more preferably not more than 70% by weight. When the content of vegetable oil is more than 80% by weight, there is a tendency that a stable emulsion is hardly prepared.

Water to be used in the step (a) of preparing an emulsion is preferably ion-exchange water and/or distilled water.

As for the surfactant used in the step (a) of preparing an emulsion, a surfactant excellent in compatibility with a vegetable oil, compatibility with water, and stability of an emulsion may be selected, however, a nonionic surfactant is preferable for the reason that affinity with a vegetable oil is high. Among nonionic surfactants, some of these have cloud points, and from the viewpoint of easiness of coagulation, a nonionic surfactant having a comparatively low cloud point is preferable. Herein, a cloud point is referred to as a temperature at which a nonionic surfactant becomes insoluble in water, and the temperature at this time is called a cloud point since the solution turns to white turbidity.

A nonionic surfactant used in the present invention has a hydrophilic part (A) and a lipophilic part (B).

As for the hydrophilic part (A), a polyoxyethylene compound having a recurring unit of an oxyethylene chain of ($-CH_2-CH_2-O-$) is used from the viewpoint that affinity with a vegetable oil is high.

The number n of recurring units of an oxyethylene chain in the hydrophilic part (A) is preferably not less than 2, more preferably not less than 4, further more preferably not less than 5. When n of the hydrophilic part (A) is less than 2, there is a tendency that the compound is not dissolved in water. The number n of the hydrophilic part (A) is preferably not more than 40, more preferably not more than 30, further more preferably not more than 20. When n of the hydrophilic part (A) is more than 40, emulsification ability is deteriorated and there is a tendency that a stable emulsion cannot be prepared.

The lipophilic part (B) is preferably an alkyl ether and/or alkenyl ether from the viewpoint that affinity with a vegetable oil is high.

Examples of alkyl ether are lauryl ether, cetyl ether, and stearyl ether, and alkyl ether which can be used in the present invention is not limited only to these examples. In addition, alkyl vinyl ether having a different number of carbon atoms may be blended.

An example of alkenyl ether is oleyl ether.

Examples of a surfactant satisfying the above-described conditions are, for instance, polyoxyethylene alkyl ether, sorbitan fatty acid ester, polyoxyethylene sorbitan fatty acid ester, polyoxyethylene sorbitol fatty acid ester, glycerin fatty acid ester, polyoxyethylene fatty acid ester, and polyoxyethylene hydrogenated castor oil, and these surfactants may be used alone, or at least two kinds thereof may be used in combination.

Among the above-described surfactants, examples of sorbitan fatty acid ester are, for instance, sorbitan monolaurate, sorbitan monopalmitate, sorbitan monostearate, sorbitan tristearate, sorbitan monooleate, sorbitan trioleate, and polyoxyethylene sorbit tetraoleate.

In order to enhance stability of the emulsion, an anionic surfactant or a cationic surfactant can be used in combination of nonionic surfactants. Examples of an anionic surfactant are, for instance, salt of alkyl sulfate, salt of polyoxyethylene alkyl ether sulfate, alkyl benzene sulfonate, fatty acid salt, and condensate of formalin and naphthalene sulfonate. Kind of an anionic surfactant or a cationic surfactant, and combination with a nonionic surfactant may be suitably selected by kind of a vegetable oil, and a ratio thereof also may be suitably selected according to kind of a vegetable oil or kind and combination of the surfactants.

A content of surfactant in an emulsion comprising a vegetable oil, water and the surfactant is preferably not less than 0.1% by weight, more preferably not less than 0.3% by weight. When the content of surfactant is less than 0.1% by weight, there is a tendency that stability of the emulsion is insufficient. The content of surfactant is preferably not more than 10% by weight, more preferably not more than 8% by weight. When the content of surfactant is more than 10% by weight, there is a tendency that the surfactant is easily remained in a rubber, and besides water absorbing property is imparted to the rubber to lower rubber physical properties, and a cost thereof is increased.

In the step (a), an O/W type emulsion can be prepared by a general method. Namely, a vegetable oil, a surfactant and water are mixed with a high speed stirring equipment such as a homogenizer to disperse the vegetable oil with a fine particle diameter in water, and thus the O/W type emulsion can be prepared.

In the step (a), the number of rotations of the high speed stirring equipment is preferably not less than 1,000 rpm, more preferably not less than 2,000 rpm. When the number of rotations of the high speed stirring equipment is less than 1,000 rpm, there is a tendency that oil drops with sufficiently fine particle diameters cannot be obtained.

A mixing time with the high speed stirring equipment in the step (a) is preferably not less than 3 minutes, more preferably not less than 5 minutes. When the mixing time with the high speed stirring equipment is less than 3 minutes, there is a tendency that a sufficiently stable emulsion cannot be obtained. The mixing time with the high speed stirring equipment is preferably not more than 5 hours, more preferably not more than 3 hours. When the mixing time with the high speed stirring equipment is more than 5 hours, no effect resulted from continuous stirring can be obtained, and thus there is a tendency that productivity is lowered.

In the step (b), the emulsion obtained in the step (a) and a modified natural rubber latex are mixed, and then the mixture is aged.

In addition to a modified natural rubber latex, examples of a rubber latex are a natural rubber latex and a synthetic rubber latex such as NBR and SBR, however, a modified natural rubber latex is used for the reasons that such a rubber latex can be obtained from one rubber tree over 20 years without consuming petroleum oil, which is excellent in the environmental point of view, further, carbon dioxide is not generated at burning, and also, the latex has properties suitable for a tire.

Examples of the modified natural rubber latex are functional group-added natural rubber latices such as ENR latex, hydrogenated natural rubber latex (H-NR latex), deproteinized natural rubber latex, maleic acid-modified natural rubber latex, and natural rubber latex obtained by further modifying these latices. These modified natural rubber latices may be used alone, or at least two kinds thereof may be used in combination. By using modified natural rubber latices, an effect on environments can be taken into consideration, provision for the future decrease of petroleum supply can be satisfied, and further, since no shearing strength from a kneader is applied, a length of a molecular chain can be kept long. Among these, ENR latex is preferable.

An ENR latex may be prepared by adding a surfactant, acetic acid or formic acid and hydrogen peroxide to a NR latex and partially epoxidizing double bonds in NR. When a solid rubber is prepared, the obtained ENR latex is coagulated by utilizing high temperature vapor, then immersed into water to extract a water soluble substance, and neutralized remaining acid and dried.

An epoxidation ratio of the ENR latex is not less than 5% by mole, and further, preferably not less than 10% by mole. When the epoxidation ratio of the ENR latex is less than 5% by mole, there is a tendency that sufficient performance as a rubber for a tire cannot be exhibited. The epoxidation ratio of the ENR latex is preferably not more than 60% by mole, more preferably not more than 50% by mole. When the epoxidation ratio of the ENR latex is more than 60% by mole, the ENR latex hardly adheres with other parts, and there is a tendency that balance in view of performances is deteriorated.

A rubber solid content in the modified natural rubber latex is preferably 10 to 80% by weight, more preferably 20 to 70% by weight. When the rubber solid content is within these ranges, compatibility with the vegetable oil emulsion is favorable.

In the step (b), the vegetable oil emulsion and the modified natural rubber latex can be mixed using a general stirrer.

The number of rotations of a stirrer in the step (b) is preferably not less than 5 rpm, more preferably not less than 10 rpm. When the number of rotations of a stirrer is less than 5 rpm, there is a tendency that sufficient stirring effects cannot be obtained. The number of rotations of a stirrer is preferably not more than 1,000 rpm, more preferably not more than 800 rpm. When the number of rotations of a stirrer is more than 1,000 rpm, there is a tendency that bubbling unnecessarily occurs.

A mixing time with a stirrer in the step (b) is preferably not less than 10 minutes. When the mixing time is less than 10 minutes, there is a tendency that an effect of stirring the vegetable oil emulsion and the modified natural rubber latex is insufficient.

It is preferable that a mixture solution of the modified natural rubber latex and the vegetable oil emulsion obtained by the above-descried mixing is further aged. Herein, maturing is referred to as absorbing the vegetable oil into the modified natural rubber latex. A maturing time is preferably 30 minutes to 2 days, and not less than 95% of the compounded vegetable oil is enough to be absorbed.

Further, in the step (c), a lump of a rubber is obtained by coagulating the mixture obtained in the step (b). The preparation of an oil extended rubber for a tire is to obtain a lump of a rubber, and a coagulation method using a dipping mold, for example, an immersion method, is not adopted. It is preferable that the step (c) of obtaining this lump of a rubber is carried out by a method of contacting the mixture obtained in the step (b) with steam, a method of adding a metallic salt, or a method of charging in an acid solution.

When a mixture of an ENR latex and an O/W type emulsion is coagulated, a chemical having a low cloud point may be added in order to assist coagulation of the modified natural rubber latex.

After coagulating the mixture of an ENR latex and an O/W type emulsion, the obtained lump of a rubber is immersed into water to extract a water soluble substance, then neutralized, and the mixture is dried to prepare an oil extended rubber.

As described above, in the present invention, an oil extended rubber for a tire is prepared by mixing an emulsion using a specific vegetable oil and a modified natural rubber latex, thereby, there can be obtained the oil extended rubber for a tire, in which an effect on environments can be taken into consideration, provision of the future decrease of petroleum supply can be satisfied, and further strength, abrasion resistance and flex crack growth resistance are excellent. In addition, an oil is not necessarily charged in a kneader at the kneading stage, and lowering of productivity is not caused.

The present invention also relates to a rubber composition for a tire comprising, as rubber components, the above-described oil extended rubber for a tire and a diene rubber.

It is preferable that, in the rubber composition for a tire of the present invention, the oil extended rubber of the present invention is used together with other diene rubbers such as NR, butadiene rubber (BR), nitrile-butadiene rubber (NBR) and styrene-butadiene rubber (SBR) for the reason that flex crack growth resistance can be improved since the sea island structure is formed and the oil extended rubber of the present invention is to be a shared island. It is further preferable that the oil extended rubber of the present invention and NR are used together for the reasons that by forming the sea island structure using a rubber component derived from resources other than petroleum resources, an effect on environments can be taken into consideration, provision for the future decrease of petroleum supply can be satisfied, and further, carbon dioxide is not emitted.

In addition to the oil extended rubber for a tire and other diene rubbers, the rubber composition for a tire of the present invention can also contain additives generally used in preparation of a rubber composition, for example, a reinforcing filler such as silica and carbon black, a silane coupling agent, zinc oxide, stearic acid, a vulcanizing agent such as sulfur, a vulcanization accelerator, a wax, an antioxidant, and a viscosity imparting agent in amounts within generally compounded ranges, according to necessity or according to required features of a part of a tire for which the composition is used. In the rubber composition of the present invention, a vegetable oil is not necessarily compounded in addition to an oil extended rubber, but a small amount of the vegetable oil may be compounded.

As for representative examples of compounding ratios of these additives, a reinforcing filler is 5 to 75 parts by weight on the basis of 100 parts by weight of the rubber components, zinc oxide is 1 to 10 parts by weight on the basis of 100 parts by weight of the rubber components, stearic acid is 0.5 to 4 parts by weight on the basis of 100 parts by weight of the rubber components, a vulcanizing agent is 0.5 to 5 parts by weight on the basis of 100 parts by weight of the rubber components, and a vulcanization accelerator is 0.1 to 5 parts by weight on the basis of 100 parts by weight of the rubber components. A silane coupling agent is preferably 5 to 15 parts by weight on the basis of 100 parts by weight of silica.

It is preferable that the rubber composition for a tire of the present invention obtained in this manner is a rubber composition which is used for a sidewall and comprises 5 to 75 parts by weight of silica on the basis of 100 parts by weight of the rubber components for the reason that flex crack resistance is excellent.

A tire of the present invention is prepared by a general method using the oil extended rubber of the present invention and further the rubber composition for a tire of the present invention. For example, when the rubber composition for a tire of the present invention is used as a rubber for a sidewall, the rubber composition of the present invention compounded with silica and, according to necessity, the above-described various additives is extraction-processed while being adjusted to a shape of a sidewall in an unvulcanization stage, and the extruded product is molded on a tire molding machine by a general method to form an unvulcanized tire. This unvulcanized tire is heated and pressurized in a vulcanizer to obtain a tire. As described above, the tire of the present invention is prepared by using the rubber composition of the present invention, thereby, the tire of the present invention is to be an ecological tire in which an effect on environments can be taken into consideration, and provision for the future decrease of petroleum supply can be satisfied.

EXAMPLES

The present invention is specifically explained based on Examples, but the present invention is not limited only thereto.

Various chemicals used in Examples and Comparative Examples are collectively explained in the following.
Modified natural rubber latex: ENR latex (rubber component: 30% by weight, epoxidation ratio: 25% by mole)
Vegetable oil 1: N/B linseed oil (linseed oil, iodine value: 191) available from Nisshin Oillio Group, Ltd.
Vegetable oil 2: Dimaron (iodine value: 208, main component: β pinene) available from Yasuhara Chemical Co., Ltd.
Vegetable oil 3: Nisshin Safflower oil (safflower oil, iodine value: 140 to 150)
Vegetable oil 4: Coconut oil (iodine value: 9)
Vegetable oil 5: Palm oil (iodine value: 52)
Vegetable oil 6: Rape seed oil (rape seed oil, iodine value: 116) available from Nisshin Oillio Group, Ltd.
Vegetable oil 7: Soy bean oil (soy bean oil, iodine value: 129) available from Nisshin Oillio Group, Ltd.
Surfactant: EMULGEN 105 (polyoxyethylene lauryl ether, the number of recurring units: 5) available from KAO CORPORATION
Natural rubber: TSR20
Silica: Ultrasil VN3 (BET: 180 m$^2$/g) available from Degussa Co.
Silane coupling agent: Si69 (bis(3-triethoxysilylpropyl)tetrasulfide) available from Degussa Co.
Stearic acid: available from NOF Corporation
Zinc oxide: available from Mitsui Mining & Smelting Co., Ltd.
Antioxidant: NOCRAC 6C (N-1,3-dimethylbutyl-N'-phenyl-p-phenylenediamine) available from Ouchi Shinko Chemical Industrial Co., Ltd.
Wax: OZOACE 0355 available from Nippon Seiro Co., Ltd.
Sulfur: available from Tsurumi Chemical Industry Co., Ltd.
Vulcanization accelerator: NOCCELER NS (N-tert-butyl-2-benzothiazolylsulfenamide) available from Ouchi Shinko Chemical Industrial Co., Ltd.
<Preparation of Vegetable Oil Emulsions>
(Preparation of Emulsion a)

Into a homogenizer were poured 50 parts by weight of the vegetable oil 1, 46 parts by weight of an ion exchange water, and 4 parts by weight of polyoxyethylene lauryl ether, and the mixture was stirred at 6,000 rpm for 1 hour to prepare an emulsion a.
(Preparation of Emulsion b)

An emulsion b was prepared in the same manner as the emulsion a except that the vegetable oil 2 was used instead of the vegetable oil 1, and 42 parts by weight of ion exchange water and 8 parts by weight of a surfactant were added.

(Preparation of Emulsion c)

An emulsion c was prepared in the same manner as the emulsion a except that the vegetable oil 3 was used instead of the vegetable oil 1.

(Preparation of Emulsion d)

An emulsion d was prepared in the same manner as the emulsion a except that the vegetable oil 4 was used instead of the vegetable oil 1, and 42 parts by weight of ion exchange water and 8 parts by weight of a surfactant were added.

(Preparation of Emulsion e)

An emulsion e was prepared in the same manner as the emulsion a except that the vegetable oil 5 was used instead of the vegetable oil 1.

(Preparation of Emulsion f)

An emulsion f was prepared in the same manner as the emulsion a except that the vegetable oil 6 was used instead of the vegetable oil 1.

(Preparation of Emulsion g)

An emulsion g was prepared in the same manner as the emulsion a except that the vegetable oil 7 was used instead of the vegetable oil 1.

Preparation Examples 1 to 7

Preparation of Oil Extended Rubbers A to G

According to the compounding formulation shown in Table 1, 333.3 parts by weight of a modified natural rubber latex (100 parts by weight of solid rubber components) and 40 parts by weight each of vegetable oil emulsions a to g were mixed by stirring at 300 rpm for 30 minutes with a general stirrer, and then, the mixture was aged while being allowed to stand at room temperature for 24 hours.

Then, steam of 100° C. was in contact with the aged mixture for coagulation. Moisture content in the rubber obtained in this manner was removed, and further immersed into pure water for 1 hour. Then, the obtained rubber was immersed into 3% ammonia water for 5 hours, and thereafter washed while passing through rolls on which notches were cut on the surfaces thereof, and the rubber was molded into a shape of a sheet, and dried at 50° C. for 3 days to prepare oil extended rubbers A to G.

Preparation Example 8

Preparation of Non-Oil Extended Rubber H

Steam of 100° C. was in contact with a modified natural rubber latex for coagulation. Moisture content in the rubber obtained in this manner was removed, and further immersed into pure water for 1 hour. Then, the obtained rubber was immersed into 3% ammonia water for 5 hours, and thereafter washed while passing through rolls on which notches were cut on the surfaces thereof, and the rubber was molded into a shape of a sheet, and dried at 50° C. for 3 days to prepare a non-oil extended rubber H.

Using the above-described oil extended rubbers A to G and the non-oil extended rubber H, the acetone extraction test shown in the following was carried out.

(Acetone Extraction Test)

The prepared oil extended rubbers A to G and non-oil extended rubber H were immersed into acetone for 96 hours. A weight ratio of the rubber after immersion to a weight of the rubber before immersion was calculated, and an acetone extraction amount was measured. The larger the acetone extraction amount is, the more an oil is taken in the rubber.

Evaluation results of the acetone extraction test are shown in Table 1.

TABLE 1

| | Preparation Example | | | | | | | |
|---|---|---|---|---|---|---|---|---|
| | 1 | 2 | 3 | 4 | 5 | 6 | 7 | 8 |
| Amounts (part by weight) | | | | | | | | |
| Modified natural rubber latex (Rubber components) | 333.3 (100) | 333.3 (100) | 333.3 (100) | 333.3 (100) | 333.3 (100) | 333.3 (100) | 333.3 (100) | 333.3 (100) |
| Emulsion a | 40 | — | — | — | — | — | — | — |
| Emulsion b | — | 40 | — | — | — | — | — | — |
| Emulsion c | — | — | 40 | — | — | — | — | — |
| Emulsion d | — | — | — | 40 | — | — | — | — |
| Emulsion e | — | — | — | — | 40 | — | — | — |
| Emulsion f | — | — | — | — | — | 40 | — | — |
| Emulsion g | — | — | — | — | — | — | 40 | — |
| Oil extended rubbers | A | B | C | D | E | F | G | Non-oil extended rubber H |
| Acetone extraction amount (%) | 18.0 | 18.3 | 17.7 | 17.6 | 17.7 | 17.7 | 17.8 | 1.7 |

Examples 1 to 5 and Comparative Examples 1 to 4

According to the compounding formulation shown in Table 2, components other than sulfur and a vulcanization accelerator were kneaded for 4 minutes using a 1.7-liter banbury mixer to obtain a kneaded product. Then, the sulfur and vulcanization accelerator were added to the obtained kneaded product, and the mixture was kneaded using an open roll to obtain an unvulcanized rubber composition. Further, the obtained unvulcanized rubber composition was press-vulcanized at 170° C. for 12 minutes to obtain vulcanized rubber compositions of Examples 1 to 5 and Comparative Examples 1 to 4.

Comparative Examples 5

According to the compounding formulation shown in Table 2, using a 1.7-liter banbury mixer, the non-oil extended rubber H was kneaded for 2 minutes under the conditions of the number of rotations of 77 rpm and a temperature of 50° C., and then thereto was gradually added the vegetable oil 1 while continuing kneading. Even after a lapse of 15 minutes of the kneading time, slip continued, and the vegetable oil 1 could not be dispersed in the non-oil extended rubber H, and the flex crack growth test shown in the following could not be carried out.

Using the above-described vulcanized rubber compositions of Examples 1 to 5 and Comparative Examples 1 to 4, the following flex crack growth resistance test was carried out.

(Flex Crack Growth Resistance)

According to JIS-K6260 "Testing of flex cracking and crack growth for rubber, vulcanized or thermoplastic (De Mattia)", 2 mm-long crack was cut in the unvulcanized rubber composition under the conditions of a temperature of 23° C. and a relative humidity of 55%, and the number of times of bending until 2 mm-long crack grew to 3 mm-long (until 1 mm-long crack was generated) was measured (if crack growth is slow, the number of times of bending until a crack grows to 1 mm long is estimated from a growing speed). Herein, log (times/mm) indicates the number of times measured until the crack is generated as a logarithm. The larger the value is, the more excellent flex crack growth resistance is, and not less than 8.0 of the evaluation result indicates that crack did not reach 1 mm-long even though the logarithm reached 8.0 (namely, 108.0).

Evaluation results of the flex crack growth resistance test are shown in Table 2.

latex, there can be provided a preparation process of an oil extended rubber for a tire, in which an effect on environments can be taken into consideration, provision for the future decrease of petroleum supply can be satisfied, further, lowering of physical properties is scarce since there is no molecular breakage resulting from kneading, and strength is excellent, an oil extended rubber for a tire obtained by the preparation process, a rubber composition for a tire containing the oil extended rubber for a tire, and further, a tire using the oil extended rubber or a rubber composition, in which flex crack growth resistance is improved.

What is claimed is:

1. A process for preparing an oil extended rubber for a tire, comprising:
   (a) a step of preparing an oil-in-water type emulsion by emulsifying not less than 30% and not more than 80% by weight of a vegetable oil having an iodine value of not less than 135 with not less than 0.1% and not more than 10% by weight of a surfactant, and the remainder water;
   (b) a step of mixing said emulsion of vegetable oil and a modified natural rubber latex, and then maturing the mixture; and
   (c) a step of coagulating the mixture obtained in the step (b) to obtain a lump of rubber,
   wherein the modified natural rubber latex is at least one selected from the group consisting of an epoxidized natural rubber latex, a hydrogenated natural rubber latex and a maleic acid-modified natural rubber latex.

TABLE 2

|  | Example | | | | | Comparative Example | | | | |
| --- | --- | --- | --- | --- | --- | --- | --- | --- | --- | --- |
|  | 1 | 2 | 3 | 4 | 5 | 1 | 2 | 3 | 4 | 5 |
| Amounts (part by weight) | | | | | | | | | | |
| Rubber component | 100 | 100 | 100 | 100 | 100 | 100 | 100 | 100 | 100 | 100 |
| Oil extended rubber (kind)/NR (weight ratio) | 36 (A)/70 | 60 (A)/50 | 36 (B)/70 | 60 (B)/50 | 36 (C)/70 | 36 (D)/70 | 36 (E)/70 | 36 (F)/70 | 36 (G)/70 | Non-oil extended rubber H |
| Vegetable oil 1 | — | — | — | — | — | — | — | — | — | 20 |
| Silica | 35 | 35 | 35 | 35 | 35 | 35 | 35 | 35 | 35 | 35 |
| Silane coupling agent | 2.5 | 2.5 | 2.5 | 2.5 | 2.5 | 2.5 | 2.5 | 2.5 | 2.5 | 2.5 |
| Stearic acid | 2.5 | 2.5 | 2.5 | 2.5 | 2.5 | 2.5 | 2.5 | 2.5 | 2.5 | 2.5 |
| Zinc oxide | 3 | 3 | 3 | 3 | 3 | 3 | 3 | 3 | 3 | 3 |
| Antioxidant | 2 | 2 | 2 | 2 | 2 | 2 | 2 | 2 | 2 | 2 |
| Wax | 1.2 | 1.2 | 1.2 | 1.2 | 1.2 | 1.2 | 1.2 | 1.2 | 1.2 | 1.2 |
| Sulfur | 1.5 | 1.5 | 1.5 | 1.5 | 1.5 | 1.5 | 1.5 | 1.5 | 1.5 | 1.5 |
| Vulcanization accelerator | 0.7 | 0.7 | 0.7 | 0.7 | 0.7 | 0.7 | 0.7 | 0.7 | 0.7 | 0.7 |
| Flex crack growth resistance | Not less than 8.0 | Not less than 8.0 | Not less than 8.0 | Not less than 8.0 | Not less than 8.0 | 6.1 | 6.3 | 6.6 | 6.5 | incapable measurement |

In Examples 1 to 5 using the oil extended rubbers A to C, wherein the vegetable oil is sufficiently dispersed in the rubber by using the emulsion of vegetable oil having an iodine value of not less than 135, and the modified natural rubber latex, an effect on environments can be taken into consideration, provision for the future decrease of petroleum supply can be satisfied, and further, flex crack growth resistance can be improved.

According to the present invention, by preparing an oil extended rubber for a tire by a specific preparation process, using a specific vegetable oil and a modified natural rubber 2. The preparation process of an oil extended rubber for a tire of claim 1, wherein said modified natural rubber latex is an epoxidized natural rubber latex having an epoxidation ratio of 5 to 60% by mole.

3. The preparation process of an oil extended rubber for a tire of claim 1, wherein said vegetable oil is at least one vegetable oil selected from the group consisting of linseed oil, tung oil, safflower oil and terpenes.

4. The preparation process of an oil extended rubber for a tire of claim 1, wherein said surfactant comprises a nonionic surfactant.

5. The preparation process of an oil extended rubber for a tire of claim 1, wherein said surfactant has a hydrophilic part (A) and a lipophilic part (B), and said hydrophilic part (A) has 2 to 40 recurring units of oxyethylene.

6. The preparation process of an oil extended rubber for a tire of claim 5, wherein said lipophilic part (B) of the surfactant is an alkyl ether structure or an alkenyl ether structure.

7. The preparation process of an oil extended rubber for a tire of claim 1, wherein said surfactant comprises at least one surfactant selected from the group consisting of polyoxyalkylene alkyl ether, sorbitan fatty acid ester, polyoxyethylene sorbitan fatty acid ester, polyoxyethylene sorbitol fatty acid ester, glycerin fatty acid ester, polyoxyethylene fatty acid ester and polyoxyethylene hydrogenated castor oil.

8. A method for preparing a tire, comprising:
(a) a step of preparing an oil-in-water type emulsion by emulsifying not less than 30% and not more than 80% by weight of a vegetable oil having an iodine value of not less than 135 with not less than 0.1% and not more than 10% by weight of a surfactant, and the remainder water;
(b) a step of mixing said emulsion of vegetable oil and a modified natural rubber latex, and then maturing the mixture;
(c) a step of coagulating the mixture obtained in the step (b) to obtain an oil extended rubber for a tire, and
the method further comprising:
a step of compounding the oil extended rubber and a diene rubber as rubber components and a silica to obtain a rubber composition for a tire, and
a step of forming a sidewall by using the rubber composition to prepare a tire, and
wherein the modified natural rubber latex is at least one selected from the group consisting of an epoxidized natural rubber latex, a hydrogenated natural rubber latex and a maleic acid-modified natural rubber latex.

* * * * *